United States Patent [19]

Nagashima

[11] Patent Number: 4,765,282
[45] Date of Patent: Aug. 23, 1988

[54] CHAIN SAW
[75] Inventor: Akira Nagashima, Kawasaki, Japan
[73] Assignee: Kioritz Corporation, Tokyo, Japan
[21] Appl. No.: 41,615
[22] Filed: Apr. 23, 1987
[30] Foreign Application Priority Data
  Apr. 23, 1986 [JP] Japan .............................. 61-61584[U]
[51] Int. Cl.[4] ................................................ F01P 7/10
[52] U.S. Cl. .................................... 123/41.7; 123/556; 123/41.67
[58] Field of Search ........................ 123/2, 41.6, 41.61, 123/41.7, 556, 198 B, 195 C, 41.67

[56] References Cited
U.S. PATENT DOCUMENTS
2,334,561 11/1943 Kopplin .............................. 123/556
3,678,973 7/1972 Loop .................................... 123/556
4,327,680 5/1982 Dauwalder ....................... 123/198 E
4,545,357 10/1985 Kearsley et al. ..................... 123/556

Primary Examiner—Willis R. Wolfe
Assistant Examiner—M. Macy
Attorney, Agent, or Firm—Browdy and Neimark

[57] ABSTRACT

A chain saw has a first shutter provided between an air intake space formed on the side of a body and a heat insulation space formed between an internal combustion engine chamber and a carbureter chamber in such a manner as to be openable and closeable such as to cut off the communication therebetween, as well as a second shutter provided between the air intake space and a passage in such a manner as to be openable and closeable such as to cut off the communication therebetween.

3 Claims, 5 Drawing Sheets

CHAIN SAW

BACKGROUND OF THE INVENTION

1. Field of the Invention

The present invention relates to a chain saw of a type which includes a body, an internal combustion engine mounted on the body and operating as a power source, a carburetor mounted within the body for supplying an air-fuel mixture to the internal combustion engine, and an air intake space provided in the body for supplying fresh air to the carburetor.

2. Description of the Prior Art

In conventional chain saws of this type, fresh air is taken in from the air inlet formed on the body so as to be supplied to the carburetor through a relatively short passageway provided in the body.

Such a chain saw has a disadvantage in that it has a relatively high level of air intake noise. Further, when the chain saw is used in a cold or hot locality, the low or high temperature fresh air is supplied to the carbureter at substantially the same low or high temperature, deteriorating the performance of the internal combustion engine. Further, at the time of rain or snow, rain drops or snow flakes will be sucked in together with air, deteriorating the air cleaner performance in a short period of using the chain saw.

SUMMARY OF THE INVENTION

Accordingly, an object of the present invention is to provide a chain saw capable of obviating the above-noted problems of the prior art which has a simple structure and is convenient to operate.

This object is achieved by providing a chain saw which is characterized by having a body containing: an internal combustion engine chamber for accommodating an internal combustion engine; a carburetor chamber formed adjacent to the internal combustion engine chamber for accommodating a carburetor; an air intake space formed on the side of the body; an intermediate wall portion formed between the internal combustion engine chamber and the carburetor chamber and having a double wall which defines a heat insulation space therein, the heat insulating space communicating with the air intake space and the carburetor chamber; and a wall portion integrally formed with the intermediate wall portion at the side of the intermediate wall portion which is opposite to the internal combustion engine chamber and having another double wall which defines a passage therein, the passage communicating with the air intake space and the carburetor chamber; and in that a first shutter is provided between the air intake space and the heat insulation space in such a manner as to be openable and closeable such as to cut off the communication therebetween while a second shutter is provided between the air intake space and the passage in such a manner as to be openable and closeable such as to cut off the communication therebetween.

With the above-described arrangement, when the chain saw is used in an environment with low outdoor temperatures as in wintertime, the first shutter is opened and the second shutter is closed so that the fresh air is introduced from the air intake space to the heat insulation space with the intermediate wall portion in which the air is suitably warmed by the heat radiating from the internal combustion engine before it flows into the carbureter chamber and passes around the carburetor to the air cleaner thereof. Furthermore, when the chain saw is used in an environment in which the outdoor air temperature is high as in summertime, the first shutter is closed and the second shutter is opened so that the fresh air is introduced from the air intake space to the carbureter chamber via the passage within the another wall portion which is spaced away from the internal combustion engine and in which the temperature of the air is not substantially raised. In the carbureter chamber, the air cools the carburetor to some degree while it passes therearound before being supplied to the air cleaner. Thus, the air reaches the air cleaner through a relatively long passage, and the level of air intake noise can therefore be maintained quite low. It is also possible to prevent rain drops or snow flakes from reaching the air cleaner in the air current. More specifically, the level of air intake noise of the chain saw can be lowered, and the chain saw can be operated in an excellent condition in environments in which the outdoor air temperature is either low or high. Deterioration of the performance of the chain saw which would occur because of dust, rain drops or show flakes being sucked into the air cleaner can be prevented.

DESCRIPTION OF THE PREFERRED EMBODIMENT

An embodiment of a chain saw of the present invention will be described hereinunder with reference to the accompanying drawings.

Figure 1:
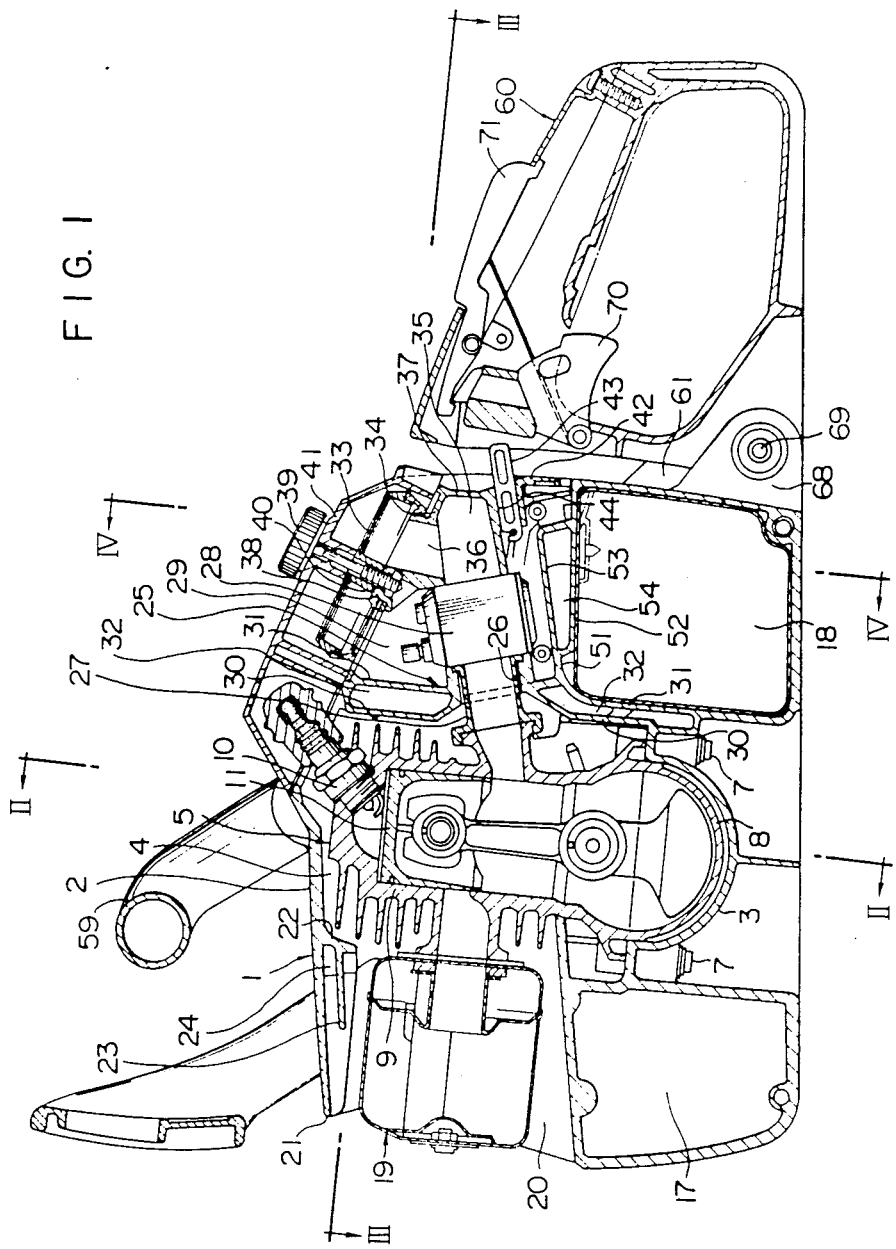
FIG. 1 is a vertical cross-sectional view of an embodiment of the present invention as viewed from the left side.
Figure 2:
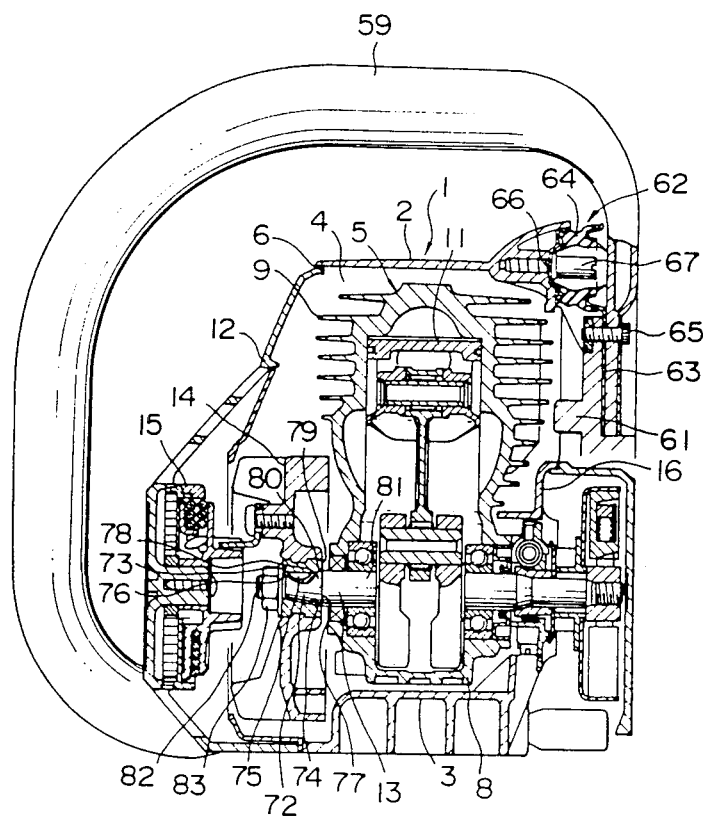
FIG. 2 is a vertical cross-section taken along the line II—II of FIG. 1 as seen when looking in the direction of the arrows.

The chain saw has a main body 1 which is of an integrally molded synthetic resin such as nylon, as shown in FIGS. 1 and 2. The body 1 includes an upper wall portion 2 and a bottom wall portion 3, the interior of which defines an internal combustion engine chamber 4 for accommodating an internal combustion engine 5. The internal combustion engine 5 is inserted in the internal combustion engine chamber 4 from a left side 6 which is open, and is fixed onto the bottom wall portion 3 by means of a plurality of bolts 7 screwed from the underside of the body 1. The internal combustion engine 5 of this embodiment is represented by a forced air-cooling two-cycle gas-fueled engine. The engine 5 has a crank case 8, and is supported on the bottom wall portion 3 of the body 1 at the center of the longitudinal length of the crank case 8. The engine 5 also has a vertical cylinder 9 extending upward in the internal combustion engine chamber 4, an ignition plug 10 mounted on the upper end of the cylinder 9, and a piston 11 disposed within the cylinder 9 in such a manner as to be movable reciprocatively in the vertical direction. The left side 6 of the body 1 is covered by a removably mounted cover 12. Inside the cover 12 are disposed a flywheel/cooling fan 14 coupled with a crank shaft 13 of the internal combustion engine 5 in a manner to be described later and a recoil starter 15 mounted on the cover 12 and coupled to the flywheel/cooling fan 14. The periphery of the flywheel/cooling fan 14 is provided with a permanent magnet so that it also functions as a magnet rotor of the ignition device of the internal combustion engine 5. The right side of the body 1 is constituted by a side wall 16 opposite the left side 6.

The body 1 also defines a saw chain lubricant tank chamber 17 at the front of the crank case 8 of the internal combustion engine 5, and a fuel tank chamber 18 at the back thereof. A left side opening of the lubricant tank chamber 17 may be closed by adhering thereto a separately provided lid plate. A tank having a relatively thin wall and formed by a synthetic resin blowing process may be inserted in the fuel tank chamber 18 from a left side opening thereof. The body 1 also defines above the lubricant tank chamber 17 a muffler chamber 20 which accommodates a muffler 19 connected to the exhaust port of the cylinder 9 of the internal combustion engine 5 and extending therefrom in the forward direction. The muffler chamber 20 is open to the outside at a forward end thereof, i.e., an external end 21 thereof, and communicates with the internal combustion engine chamber 4 at a rear end thereof, i.e., an internal end thereof.

The upper wall portion 2 of the body 1 has an inwardly protruding bracket wall portion 22 integrally formed therewith between the internal combustion engine chamber 4 and the muffler chamber 20. An inner wall portion 23 is formed with the bracket wall portion 22 as a unit in such a manner that it extends into the upper portion of the muffler chamber 20 at a position spaced apart from the upper wall portion 2 in the inward direction and substantially parallel thereto. The bracket wall portion 22 and the inner wall portion 23, together with the upper wall portion 2, provide a double wall structure with a heat insulation space 24 formed therebetween. This is effective in minimizing the transmission of heat emanated from the cylinder 9 of the internal combustion engine 5 and the muffler 19 to the outside through the upper wall portion 2. It is also advantageous in increasing the structural strength of the chain saw.

The body 1 has an intermediate wall portion 25 formed integrally therewith. The intermediate wall portion 25 extends between the right and left sides of the body 1 at the rear of the internal combustion engine chamber 4. It has a circular opening 26 at the substantially central portion thereof, through which a duct 27 made of synthetic rubber is passed. One end of the duct 27 is coupled to the suction port of the cylinder 9 of the internal combustion engine 5, while the other end thereof is connected to the outlet of a carburetor 28. An air-fuel mixture is supplied from the carburetor 28 to the internal combustion engine 5 through this duct 27. The carburetor 28 is mounted at the opening 26 which forms a mounting seat thereof, and is disposed in a carburetor chamber 29 formed above the fuel tank chamber 18 in the body 1 and separated from the internal combustion engine chamber 4 by the intermediate wall portion 25. The intermediate wall portion 25 comprises two double wall portions 30 and 31 which are spaced away from each other and extend in the vertical direction. Each of the double wall portions 30 and 31 forms a heat insulation space 32 therein. The intermediate wall portion 25 thus has a double wall structure, and the transmission of heat emanating from the internal combustion engine chamber 4 can be thereby effectively prevented from reaching the carburetor chamber 29 and the fuel tank chamber 18, and the structural strength and the vibration-proof effect of the chain saw can also be increased.

Within the carburetor chamber 29 and in the rear portion of the body 1, an elbow tube 34 connecting the inlet of the carburetor 28 and the outlet of an air cleaner 33 is fixed by means of carburetor mounting bolts. The elbow tube 34 forms therein a horizontal passage portion 35 extending coaxially from the inlet of the carburetor 28, as well as a vertical passage portion 36 extending upward along an axis which crosses the axis of the horizontal passage portion 35 at an angle. One end of the horizontal passage portion 35 is coupled with the inlet of the carburetor 28, while the other end thereof is closed by an end wall 37. The upper end of the vertical passage 36 portion is coupled with the outlet of the air cleaner 33, while the lower end thereof opens into the upper side of the horizontal passage portion 35 at an intermediate portion thereof away from the end wall 37. The upper end of the elbow tube 34 is provided with a bracket portion 38 integrally formed therewith and having a threaded hole 40 thereon into which a thread 39 may be screwed. A cleaner cover 41 and the air cleaner 33 are removably fixed to the body 1 and the elbow tube 34 by screwing this thread 39 into the hole 40 through the cleaner cover 41 and the air cleaner 33. The underside of the end wall 37 of the elbow tube 34 is provided with a bracket portion 42 integrally formed therewith. The bracket portion 42 forms a guide passageway 44 along which a throttle rod 43 of the internal combustion engine 5 is slidably guided in the horizontal direction. With this arrangement of the elbow tube 34, it is possible to prevent any air-fuel mixture from flowing into the air cleaner 33 via the vertical passage portion 36, even if it is blown back from the carburetor 28 into the horizontal passage portion 35 of the elbow tube 34 by virtue of the reverse pressure that occurs during the operation of the internal combustion engine 5, and the air cleaner 33 can thus effectively be prevented from becoming dirty. This enables the dimension of the outlet opening of the air cleaner 33 to be made large, increasing the air feeding efficiency thereof. Further, the mounting seat of the air cleaner 33 and the cleaner cover 41 and the guide of the throttle rod 43 are all made as one unit, thereby simplifying the structure and decreasing the size of the device.

Figure 3:
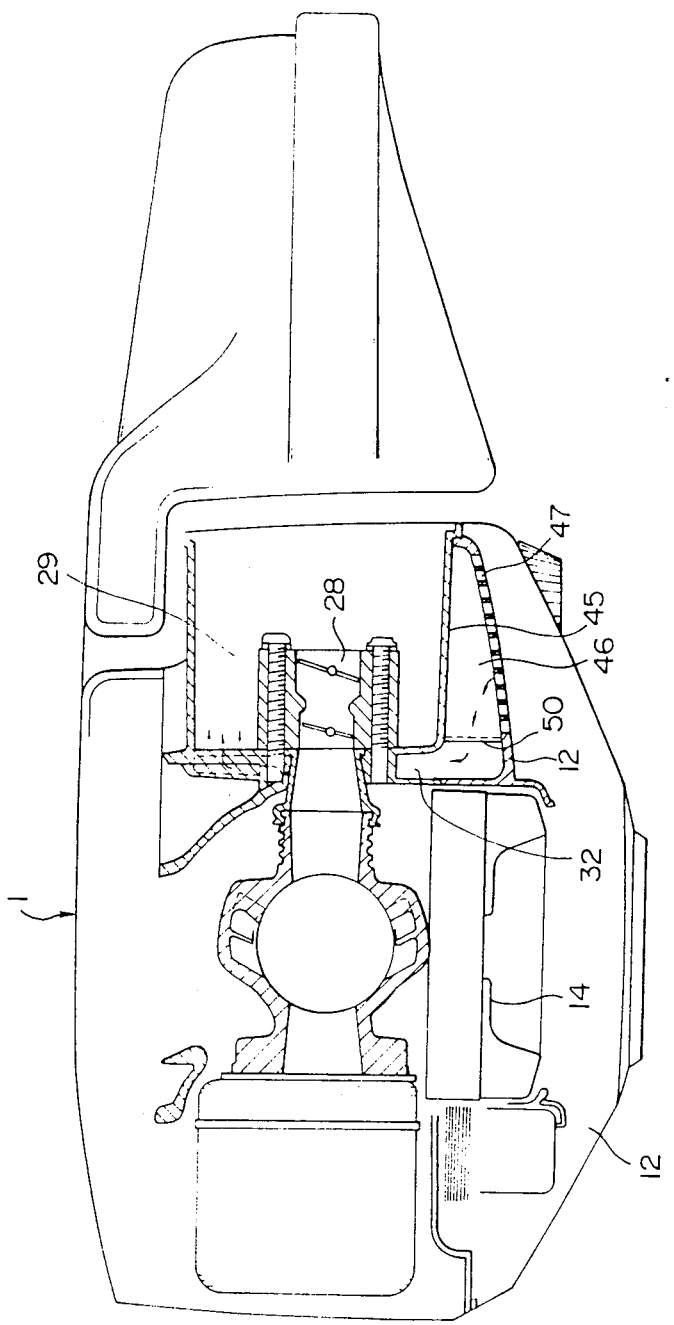
FIG. 3 is a horizontal cross-section taken along the line III—III of FIG. 1 as seen when looking in the direction of the arrows.
Figure 4:
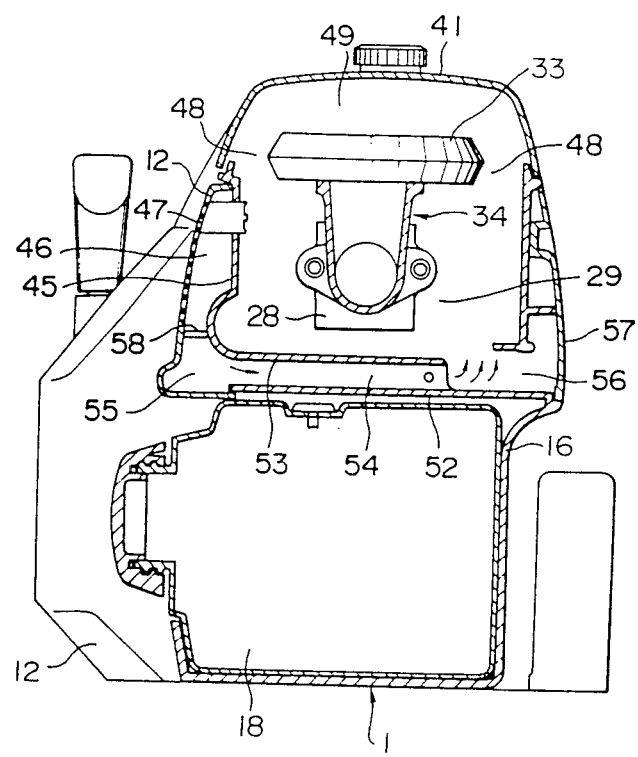
FIG. 4 is a vertical cross-section taken along the line IV—IV of FIG. 1 as seen when looking in the direction of the the arrows.
Figure 5:
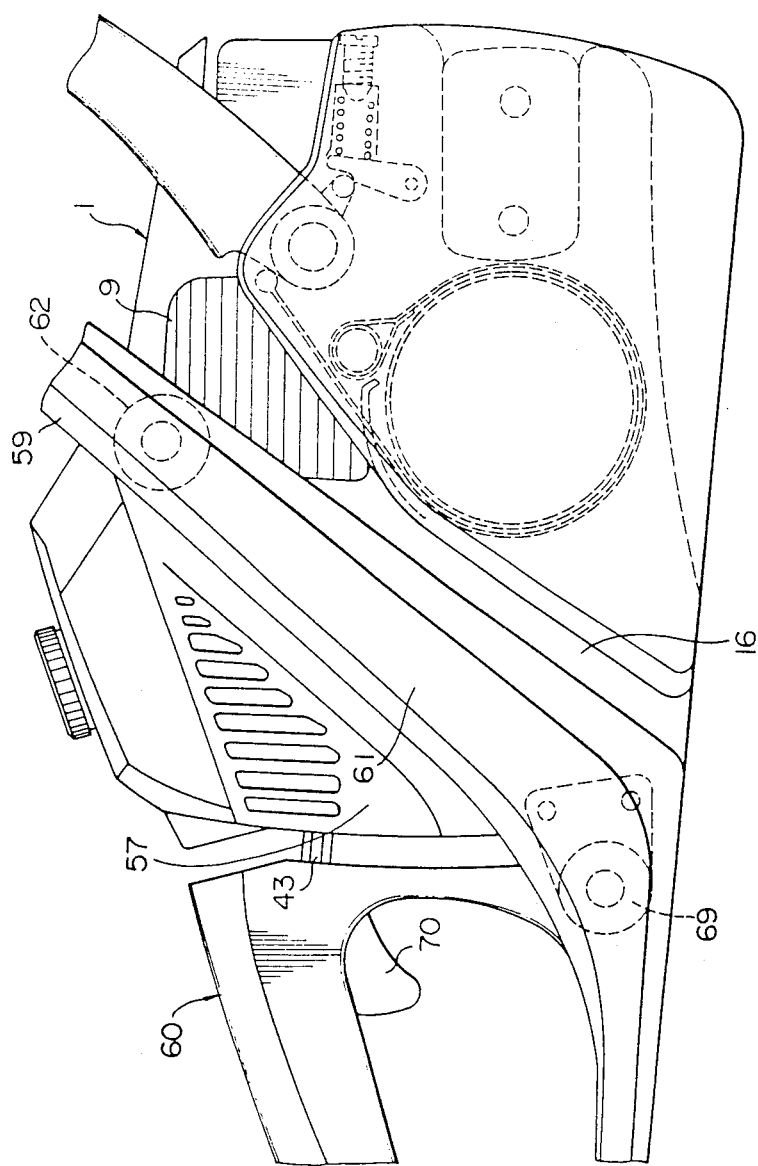
FIG. 5 is a side view of the embodiment of FIG. 1 as seen from right side with part broken away.

The body 1 has on its left side 6 a side wall portion 45 which is recessed inward and integrally formed with the body 1 (see FIGS. 3 and 4). The side wall portion 45 and the cover 12 together form an air induction space 46 therebetween. Air is introduced into the air induction space 46 through a large number of small holes 47 formed in the cover 12. Relatively large particles of dirt contained in the air are removed as the air passes through the small holes 47. The air induction space 46 communicates at one end thereof with one end of the heat insulation space 32 of the intermediate wall portion 25 of the body 1, and the heat insulation space 32 also opens into the carburetor chamber 29 at the other end thereof. The carbureter chamber 29 communicates with a space 49 in the cleaner cover 41 via a passage 48, and also with the inlet of the air cleaner 33. A first shutter 50 of a suitable construction may be mounted between the air induction space 46 and the heat insulation space 32 in such a manner that it can be opened and closed so that the flow of air therebetween is interrupted as required.

The body 1 also has a wall portion 51 (see FIG. 1) integrally formed therewith. The wall portion 51 separates the fuel tank chamber 18 from the carburetor chamber 29, and comprises horizontally extending wall portions 52 and 53 which form a horizontal passage 54 (see FIG. 4) therebetween. The passage 54 communicates with the lower end of the air induction space 46 at one end thereof and with the carbureter chamber 29 at the other end thereof. With this arrangement, the air introduced into the air induction space 46 changes direction about 90 degrees at the lower end thereof, and flows into the passage 54 then into the carburetor chamber 29 before it is supplied to the air cleaner 33 in the manner described above. The lower end of the air induction space 46, at which the direction of air flow is changed, constitutes a dust trap 55. Dust which accumulates here can be easily disposed of by removing the cover 12 from the body 1. Similarly, the area between the passage 54 and the carburetor chamber 29, at which the direction of air flow is changed, constitutes a second dust trap 56. Dust which accommodates here can be easily disposed of by removing a cover 57 from the body 1. A suitably constructed second shutter 58 may be mounted at the lower end of the air induction space 46 in such a manner that it can be opened and closed so that the flow of air from the air induction space 46 to the passage 54 is cut off as required.

When the chain saw is used in an environment in which the ambient air temperature is low, like in winter, the first shutter 50 is opened by, for example, removing it so that the air induction space 46 and the heat insulation space 32 communicate with each other, and the second shutter 58 is closed by, for example, mounting it so that the communication between the air induction space 46 and the passage 54 is interrupted. In consequence, the air flowing into the air induction space 46 flows into the heat insulation space 32, in which it is suitably warmed by the heat emanating from the internal combustion engine 5, before flowing into the air cleaner 33 via the carbureter chamber 29, passage 48, and space 49 so as to be cleaned for the last time. This warmed, cleaned air is then supplied to the carburetor 28 via the elbow tube 34, and the air-fuel mixture is supplied from the carburetor 28 to the internal combustion engine 5 via the duct 27, thereby enabling the engine to óperate well.

Furthermore, when the chain saw is used in an environment in which the ambient air temperature is high, like in summer, the first shutter 50 is closed by, for example, mounting it so that the communication between the air induction space 46 and the heat insulation space 32 is interrupted, and the second shutter 58 is opened by, for example, removing it so that the air induction space 46 and the passage 54 communicate with each other. In consequence, the outside air flows from the air induction space 46 into the carburetor chamber 29 via the passage 54, and then into the air cleaner 33 via the passage 48 and the space 49.

Thus, the air flow passages to the air cleaner 33 can be suitably switched over in accordance with the environment in which the chain saw is used. As a result, the operation of the carburetor 28 can be maintained at an optimum, and intake air noise can be reduced. It is also possible to operate the chain saw in a satisfactory manner when rain or snow is falling.

The chain saw of this embodiment has a front handle 59 and a rear handle 60. As shown in FIG. 2, the upper right end of the front handle 59 is fixed to the upper end of a connecting member 61 integrally formed with the rear handle 60 integrally formed with the upper wall portion 2 of the body 1 through a rubber cushioning member 62. The cushioning member 62 comprises a seat portion 63 and an annular rubber portion 64 which are integrally formed with each other. The seat portion 63 is interposed between the front handle 59 and the connecting member 61, and is fixed together with these members by means of a screw 65. The annular rubber portion 64 is fixed to the upper wall portion 2 of the body 1 by means of a screw 67 through a washer 66 plated on one end thereof, while the other end thereof abuts against the front handle 59 so as to elastically support it. Similarly, the left lower end of the front handle 59 is linked to the lower portion of the left side of the body 1 through a cushioning member, although this is not shown.

The connecting member 61 extends toward the lower rear portion of the body 1 at a slant, on the side thereof. The lower rear end of the body 1 is provided with a bracket portion 68 which is integrally formed therewith and which protrudes backward. The lower front end of the rear handle 60, after being connected to the lower end of the connecting member 61, is disposed on the external side of the bracket portion 68, and the lower front end of the rear handle 60 and the bracket portion 68 are connected to each other by means of a bolt with a suitable cushioning member 69 interposed therebetween. Since the rear handle 60 is thus linked to the body 1 at the front lower end thereof, a trigger 70 for operating the throttle rod 43, a locking device 71 for the trigger 70, and other operating switches can be disposed with a large degree of freedom at the upper portion of the rear handle 60. As a result, the operability and workability of the chain saw can be increased. Further, the rear handle 60 can be disposed very closely to the body 1, and this can reduce the size of the chain saw.

As shown in FIG. 2, the outer peripheral surface of an end portion 72 of the crank shaft 13 which fixes the flywheel/cooling fan 14 is tapered in such a manner that the diameter thereof decreases toward the external end thereof. A central hole 74 formed in a central boss portion 73 of the flywheel/cooling fan 14 has an inner peripheral surface which compensates for the tapered surface of the end portion 72 of the crank shaft 13, so that it fits closely onto the end portion 72. The tapered surface of the end portion 72 of the crank shaft 13 is provided with a key 75 which extends in the axial direction from the external end of the end portion 72, and the key fits into a keyway 76 formed on the central hole 74 of the central boss portion 73 of the flywheel/cooling fan 14. The key 75 is disposed at the central portion of the tapered surface of the end portion 72 of the crank shaft 13 in such a way that a tapered surface 78 is left at the side of an internal large diameter end 77 of the tapered surface of the end portion 72 of the crank shaft 13. On the other hand, the keyway 76 terminates at an intermediate portion of the central hole 74 in such a way that a tapered inner peripheral surface 80, which closely engages with the tapered surface 78 of the end portion 72 of the crank shaft 13, remains at the side of an internal end 79 of the central hole 74 of the central boss portion 73. In this way, the radial distance between the central axis and the bottom of the keyway 76 is made smaller than the radius of the main portion 81 of the crank shaft 13, and the end portion 72 of the crank shaft 13 and the central boss portion 73 of the flywheel/cooling fan 14 are closed engaged with each other along the entire periphery thereof at the tapered surface 78 and the tapered inner peripheral surface 80 which are located on the inner sides thereof. This can prevent breakage of the coupling portion between the crank shaft 13 and the flywheel/cooling fan 14 due to fretting, also preventing excessive stress from being locally generated in this coupling portion, and so enabling the provision of a chain saw which is small in size and light in weight. This also makes it possible for the chain saw to be manufactured at a relatively low cost. In addition, the flywheel/cooling fan 14 is fixed to the crank shaft 13 by means of a nut 83 screwed onto a threaded portion 82 formed at the far end of the end portion 72 of the crank shaft 13.

What is claimed is:

1. A chain saw having a body containing: an internal combustion engine chamber; a carburetor chamber formed adjacent to said internal combustion engine chamber; an air intake space formed on the side of said body; a first wall portion separating said internal combustion engine chamber and said carburetor chamber which comprises a first double wall defining a heat insulation space which communicates said air intake space with said carburetor chamber; a second wall portion formed integrally with said first wall portion on a side of the first wall portion opposite to said internal combustion engine chamber, said second wall portion comprising a second double wall which defines a communication passage which communicates said air intake space with said carburetor chamber; a first shutter provided between said air intake space and said heat insulation space, said first shutter adapted to selectively cut off communication so that air cannot pass between said air intake space and said heat insulation space but must pass directly through said communication passage when ambient temperature is warm and a second shutter provided between said air intake space and said communication passage adapted to selectively cut off communication so that air cannot pass between said air intake space and said communication passage but must pass through said heat insulating space when ambient temperature is cold.

2. The chain saw according to claim 1, wherein said heat insulation space and said communication passage are formed at substantially right angles with respect to one another, said communication passage communicating with said carburetor chamber at a substantially right angle.

3. The chain saw according to claim 2, further comprising first and second dust traps formed where said heat insulation space meets said communication passage and where said communication passages meets said carburetor chamber, respectively, for trapping dust.

* * * * *